United States Patent
Asai et al.

[19]

[11] Patent Number: 6,146,275
[45] Date of Patent: Nov. 14, 2000

[54] IMAGE PROCESSING APPARATUS

[75] Inventors: Toshinori Asai; Toshinori Suzuki, both of Tokyo, Japan

[73] Assignee: Sega Enterprises, Ltd., Tokyo, Japan

[21] Appl. No.: 08/875,683

[22] PCT Filed: Dec. 2, 1996

[86] PCT No.: PCT/JP96/03523

§ 371 Date: Oct. 17, 1997

§ 102(e) Date: Oct. 17, 1997

[87] PCT Pub. No.: WO97/21169

PCT Pub. Date: Jun. 12, 1997

[30] Foreign Application Priority Data

Dec. 1, 1995 [JP] Japan ................................. 7-314567

[51] Int. Cl.$^7$ .............................. A63F 13/00; A63F 9/24; G06F 17/00; G06F 19/00

[52] U.S. Cl. .................................. 463/31; 463/1; 463/32; 345/131; 345/132; 345/133

[58] Field of Search ................... 463/31, 32, 1, 463/40; 700/91, 92; 345/121, 131, 133, 132

[56] References Cited

U.S. PATENT DOCUMENTS

| | | | |
|---|---|---|---|
| 4,359,223 | 11/1982 | Baer et al. ........................ | 273/85 G X |
| 4,600,200 | 7/1986 | Oka et al. ............................ | 273/313 X |
| 4,617,596 | 10/1986 | Yoshida et al. ..................... | 358/280 X |
| 4,618,927 | 10/1986 | Hatta .................................... | 364/410 X |
| 4,894,774 | 1/1990 | McCathy et al. ................... | 364/410 X |
| 4,905,147 | 2/1990 | Logg ................................... | 364/410 X |
| 5,872,869 | 2/1999 | Shimizu et al. .................... | 382/282 X |

FOREIGN PATENT DOCUMENTS

| | | |
|---|---|---|
| 0 558 106 A2 | 4/1989 | European Pat. Off. . |
| 90 02683 | 3/1990 | France . |

*Primary Examiner*—Jessica J. Harrison
*Assistant Examiner*—Binh-An Nguyen
*Attorney, Agent, or Firm*—Lackenbach Siegel Marzullo Aronson & Greenspan

[57] ABSTRACT

An image processing apparatus capable of displaying guidance and of setting the operating environment for an application program when the capability of a computer system is different from the operating environment expected by the application program. The image processing apparatus comprises: a CD-ROM drive 8 for loading an application program; a main processing unit 2 for forming graphic signals by executing the application program; and a display 3 for displaying the graphic signals. The main processing unit comprises: a determining unit 211 for determining whether or not the main processing unit 2 has provided the operating environment expected by the application program; a display control unit 212 for displaying guidance on the display 3 based on the results of the determination of the determining unit 211; and a setting unit 213 for allowing the operating environment of the application program to be set by the main processing unit 2.

7 Claims, 9 Drawing Sheets

IMAGE PROCESSING APPARATUS

TECHNICAL FIELD

The present invention relates to an image processing apparatus, and more particularly to an image processing apparatus in which guidance is displayed when the processing capability of the main processing unit is different than the operating environment expected by the application program. The present invention also relates to an image processing apparatus in which guidance is referenced to allow the operating environment of the application program to be set.

BACKGROUND ART

In the case of game machines, all users can play games with the same game quality in the same game program because it is assumed that users have hardware with the same processing capability.

However, when a game program is read into a general-purpose computer system for use, the image processing speed is often controlled by the capability of the computer system, and the same game program cannot be played with the same game quality.

As a result, in the past, when the capability of the computer system did not have the operating environment expected by the game program, the game was continued, for example, while the image quality was preserved and the character operating speed or the speed at which the game advanced fell off, or conversely there was a drop in image quality, with emphasis placed on preserving the game qualities. Here, "game qualities" usually means the sense of game speed as well as the quality, characteristics, and the like involved in executing the game, such as the corresponding level of difficulty.

In the past, however, when the main processing unit of a computer system could not sustain the operating environment expected by the game program, the game was executed with the game qualities in a special state determined by the manufacturer. As a result, the user had to play the game based on these determined game qualities, and the game qualities could not be set to one's satisfaction.

In the case of conventional units, the user could know that the main processing unit lacked the capabilities because of the special game qualities that resulted when the main processing unit could not provide the operating environment expected by the game program. However, in the past it was not possible to objectively determine the extent of the insufficiency in capability between the operating environment required by the program and the current operating environment, and the game qualities had to be set to a standard special level.

An object of the present invention is to resolve the drawbacks of the prior art described above so as to provide an image processing apparatus capable of displaying guidance when the capability of a computer system is different from the operating environment expected by the application program.

Another object of the present invention is to provide an image processing apparatus capable of setting the operating environment of the application program.

SUMMARY OF THE INVENTION

To achieve the objectives described above, the image processing apparatus is equipped with means for allowing an application program to be adapted, a main processing unit for forming graphic signals by executing the application program, and display means for displaying the graphic signals from the main processing unit, wherein the main processing unit comprises: determining means, for determining whether or not the main processing unit has provided the operating environment expected by an application program; and display control means for displaying guidance on the display means based on the results of determination by said determining means.

Accordingly, in the invention described in the determining means determines whether or not the main processing unit has provided the operating environment expected by the application program. When the determining means determines that the main processing unit has not provided the operating environment expected by the application program, the display control means displays guidance on the display means according to the results of the determination.

The invention is also characterized in that the main processing unit further comprises: setting means for allowing the operating environment of the application program to be set by the main processing unit; and operating means for allowing operations to be added to said setting means based on guidance.

The invention is also characterized in that said determining means is a means for determining whether or not the main processing unit has provided the number of display frames expected by the application program.

The invention is also characterized in that the guidance is a warning display for displaying the current number of display frames and the proper number of display frames.

The invention is also characterized in that the application program is a game program.

The invention is further characterized by the use of a medium, such as a CD-ROM, ROM cassette, floppy disk, or DVD disk, in which is recorded a program for activating a computer system as an image processing apparatus.

KEY

1: computer system; 2: main processing unit; 3: display (display means); 4: keyboard; 5: mouse; 6: operating pads; 7: speakers; 8: CD-ROM drive; 9: FDD; 21: main processor; 22: main memory; 23: graphic board; 24: display interface;

25: keyboard mouse and interface; 26: pad interface; 27: sound board; 211: determining means; 212: display control means; 213: setting means; 214: operation control means; 221: display flag; 222: set value memory zone; 223: second display flag; 241: frame counter.

DESCRIPTION OF A PRESENTLY PREFERRED EMBODIMENT

Figure 1:
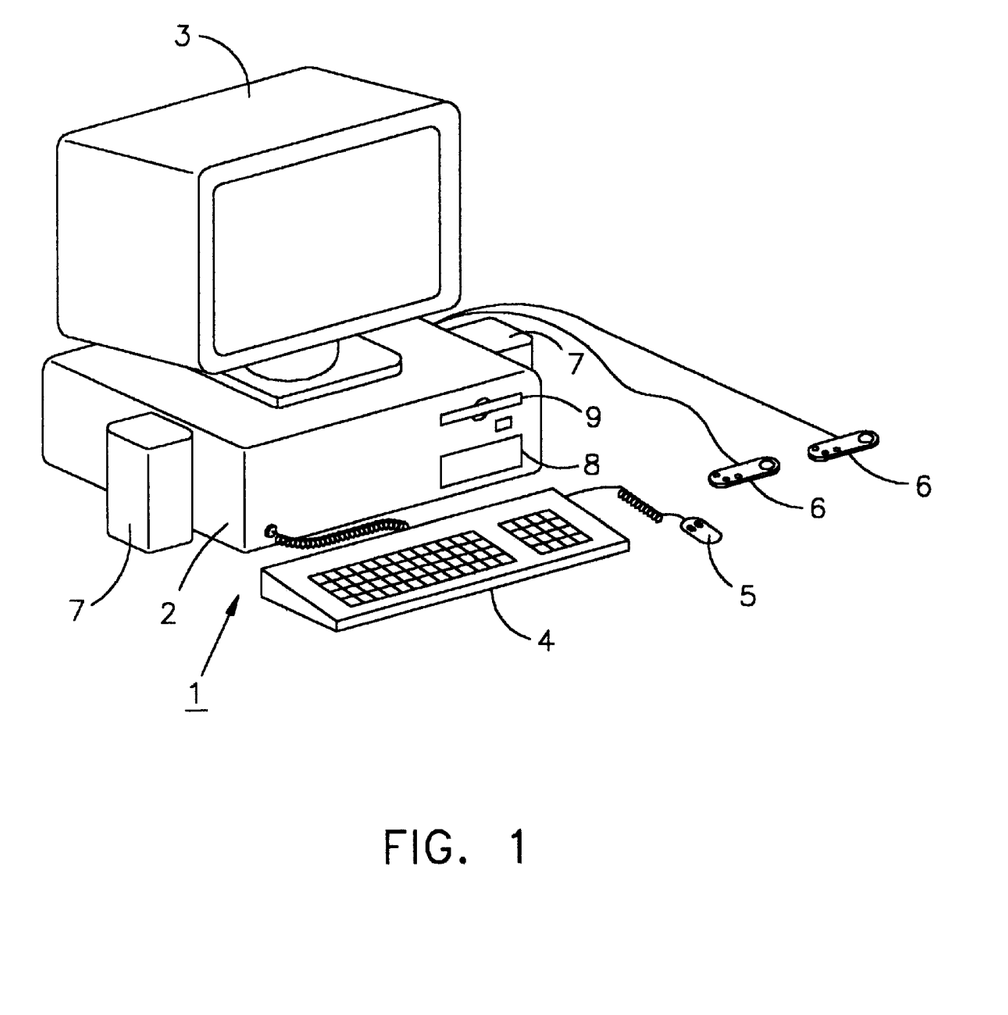
FIG. 1 is a perspective view of a computer system constituting the image processing apparatus of the present invention.

Embodiments of the present invention are described below with reference to FIGS. 1 through 9. FIG. 1 is a prespective view of a general-purpose computer system serving as the image processing apparatus. In this figure, the numerical symbol 1 is a general-purpose computer system, and this computer system 1 consists of the following structural elements.

That is, the computer system 1 is equipped with a main processing unit 2, a CRT display (display means) 3, a keyboard 4, a mouse 5, operating pads 6 and 6 which are game operating plates, and speakers 7 and 7.

The interior of the main processing unit 2 is equipped with a CD-ROM (compact disk read only memory) drive 8 and a floppy disk drive (FDD) 9. The main processing unit 2 is electrically connected to the display 3, keyboard 4, mouse 5, operating pads 6 and 6, speakers 7 and 7, CD-ROM drive 8, and FDD 9.

The main processing unit 2 reads the game program from the CD-ROM drive 8, processes the game program, and sets the game program operating environment settings or processes the guidance display. The program which allows the computer to function as an image processing apparatus can be provided by the CD-ROM or another data recording medium, such as a floppy disk, DVD disk, ROM card, or ROM cartridge. It can also be down-loaded from a data base via a communication channel. The keyboard 4, mouse 5, and operating pads 6 and 6 can input prescribed data to the main processing unit 2.

The speakers 7 can play back the sound signals generated as the game program is processed. The CD-ROM drive 8 inputs the game program recorded on the CD (compact disk) to the main processing unit 2. The FDD 9 is a device in which data or programs recorded on the floppy disk are given to the main processing unit 2, and in which data or programs processed by the main processing unit 2 are written to the floppy disk.

Figure 2:
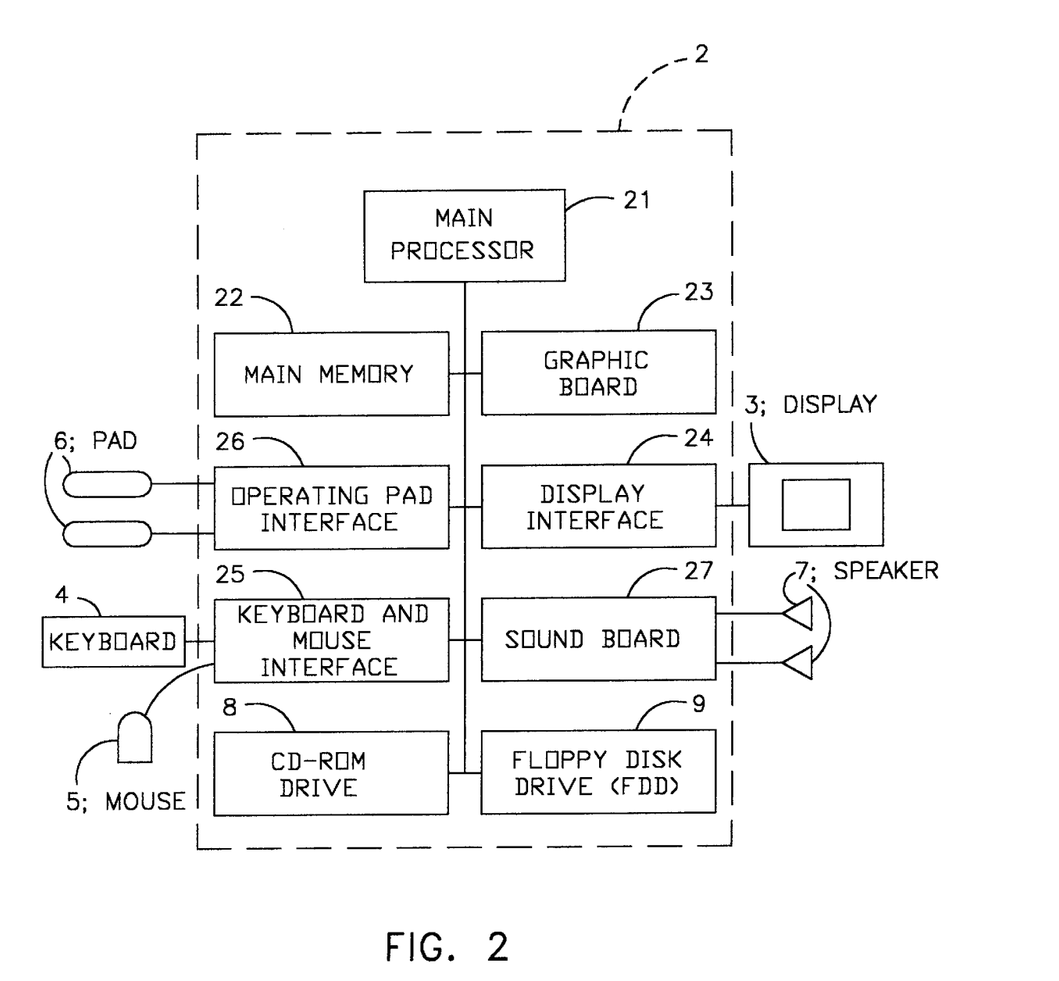
FIG. 2 is a block diagram of the same computer system.

FIG. 2 is a schematic block diagram depicting the main processing unit of the computer system. The main processing unit 2 is equipped with a central processing unit (main processor) 21, a main memory 22, a graphic board 23, a display interface 24, a keyboard and mouse interface 25, a pad interface 26, and a sound board 27.

The main processor 21 is electrically connected to the main memory 22, graphic board 23, display interface 24, keyboard and mouse interface 25, pad interface 26, sound board 27, CD-ROM drive 8, and FDD 9.

The keyboard and mouse interface 25 is electrically connected to the keyboard 4 and mouse 5. The display interface 24 is electrically connected to the display 3. The sound board 27 can play back sound signals under the control of the main processor 21 and can give sound signals from the outside to the main processor 21. The sound board 27 is connected to the two channel speakers 7 and 7.

The CD-ROM drive 8 serves to transfer game programs and the like played back from the CD to the main memory 22 under the control of the main processor 21. The FDD 9 can give programs or data played back from a floppy disk to the main processor 21 or the like under the control of the main processor 211, and can write data and the like processed by the main processor 21 to the floppy disk inside the FDD 9. The operating pad interface 28 can provide data input from the operating pads 6 and 6 to the main processor 21.

Figure 3:
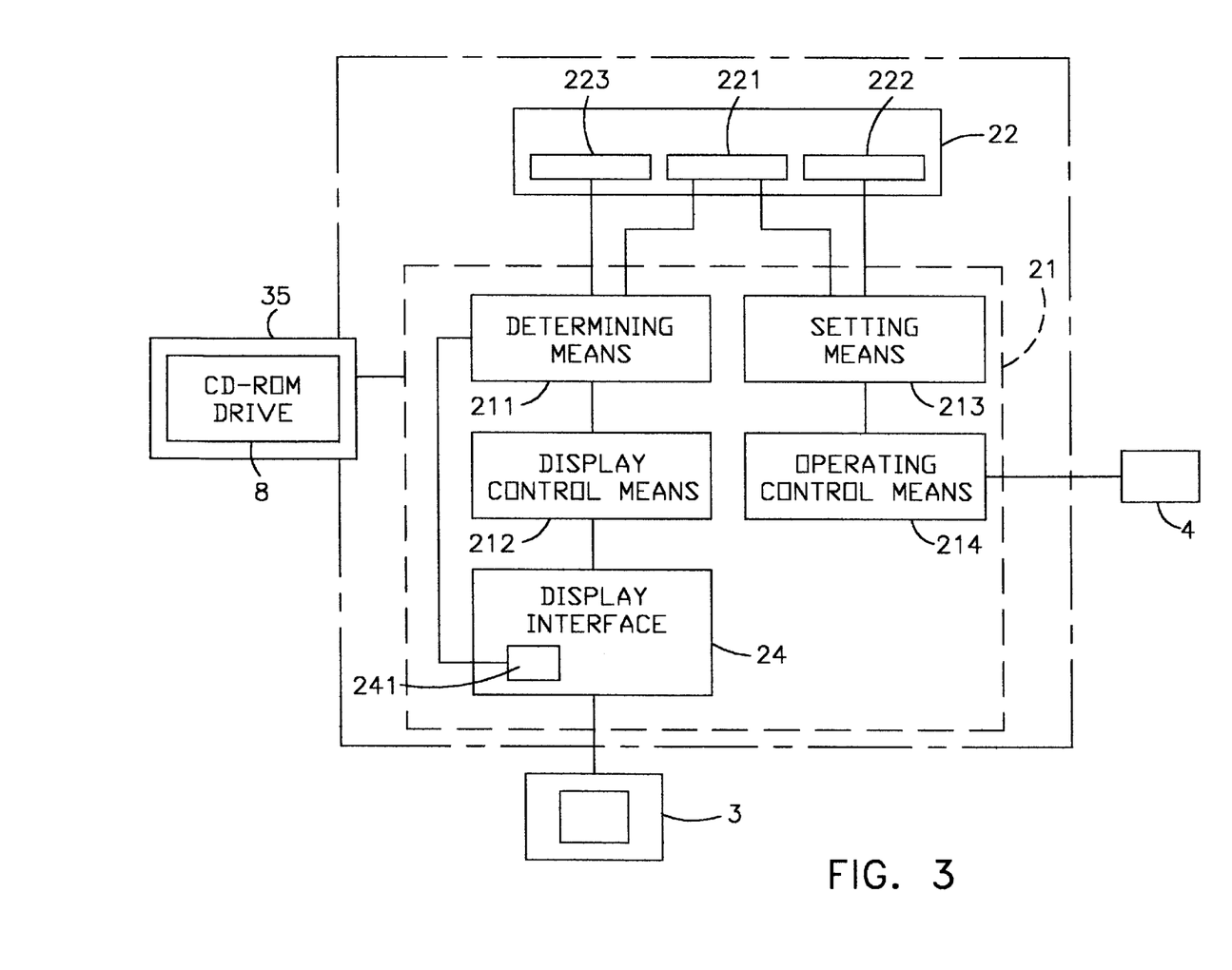
FIG. 3 is a block diagram of the functions of the image processing apparatus of the present invention.

FIG. 3 is a functional block diagram depicting the means through which the main processor 21 processes the game program. The numerical symbol 35, corresponding, for example, to the CD-ROM drive 8, is a means for allowing the game program, which is the application program, to be processed by the main processor 21 of the main processing unit 2. The main processor 21 of the main processing unit 2 executes the application program stored in main memory 22, so as to form graphic signals. The display 3 is a device for displaying the graphic signals from the main processing unit 2.

The main processor 21 of the main processing unit 2 processes the game program stored in main memory 22 or the like, thereby activating the determining means 211, display control means 212, and setting means 213. The determining means 211 can determine whether or not the main processing unit 2 has provided the operating environment expected by the game program.

Specifically, the determining means 211 can read the data of the frame counter 241 located inside the display interface 24. The determining means 211 determines whether or not the operating environment expected by the game program is available based on the number of display frames in the frame counter 241.

The determining means 211 can turn the display flags 221 and 223 on and off, and can reference the display flags 221 and 223 according to processing stage. The determining means 211 also can determine whether or not there is room for image processing.

The results of the determination by the determining means 211 are given to the display control means 212. The display control means 212 produces guidance based on the results of the determination by the determining means 211, and controls the display interface 24 to give the guidance to the display 3.

The setting means 213 sets the operating environment for the game program in the main processing unit 2, and stores the set operating environment in the set value memory zone 222 of the main memory 22.

When the operating environment is stored in this set value memory zone 222, the game program is processed by the set operating environment unless it is subsequently modified. The setting means 213 can clear the display flag 221.

The setting means 213 can be operated by an operating means. When, for example, prescribed keys cn the keyboard 4 or the like are depressed according to the guidance displayed on the display 3, the operating control means 214 can be actuated to operate the setting means 213. The operating means is composed of the keyboard 4 and operating control means 214.

Figure 4:
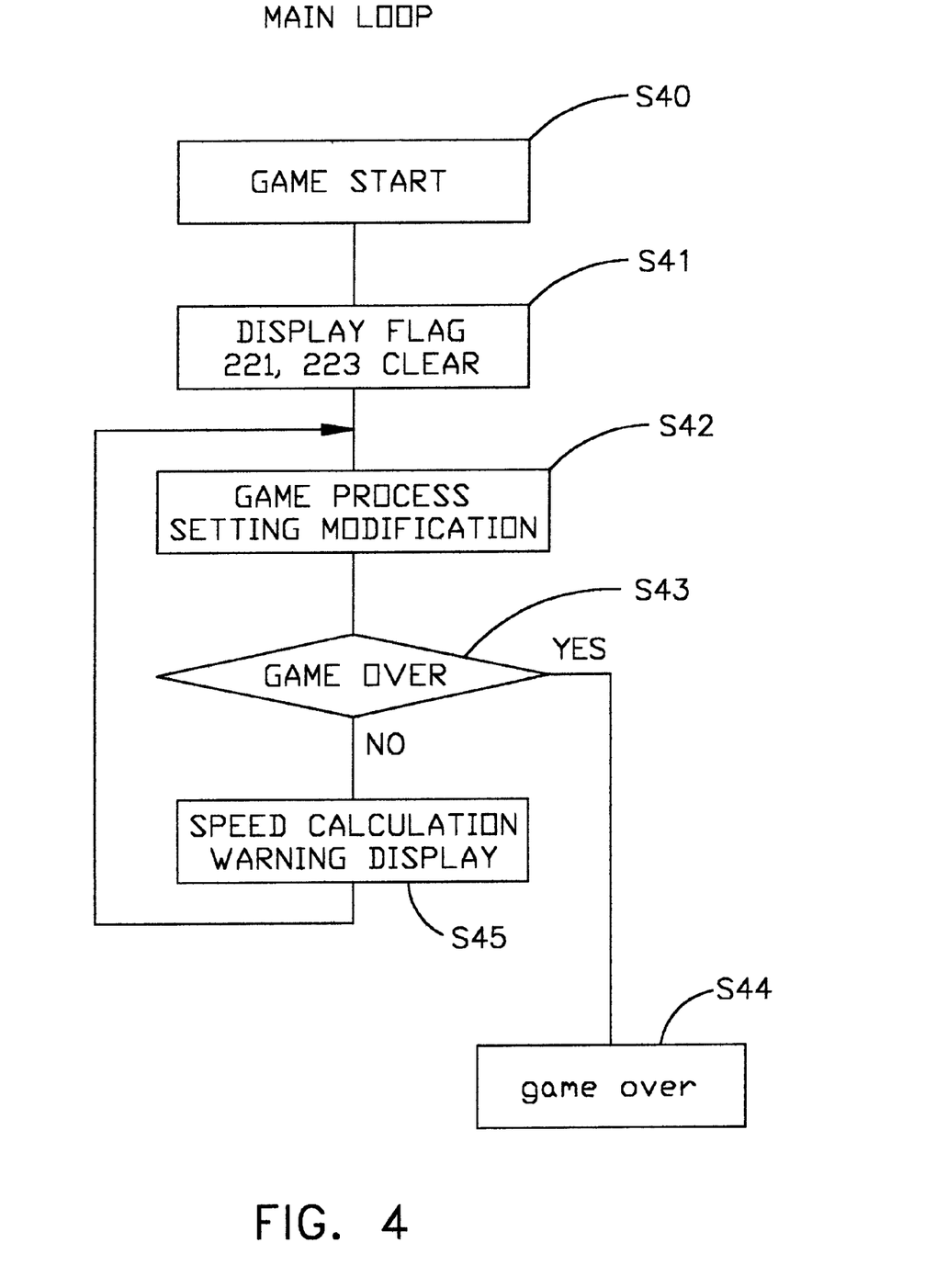
FIG. 4 is a flow chart depicting the main processing routine of the image processing apparatus.

The course of the main processing routine is described below with reference to the flow chart in FIG. 4. When the game is started (step 40), the main processor 21 of the main processing unit 2 clears the display flag 221 (step 41). The main processor 21 then processes the game or modifies the settings (step 42).

Figure 7:
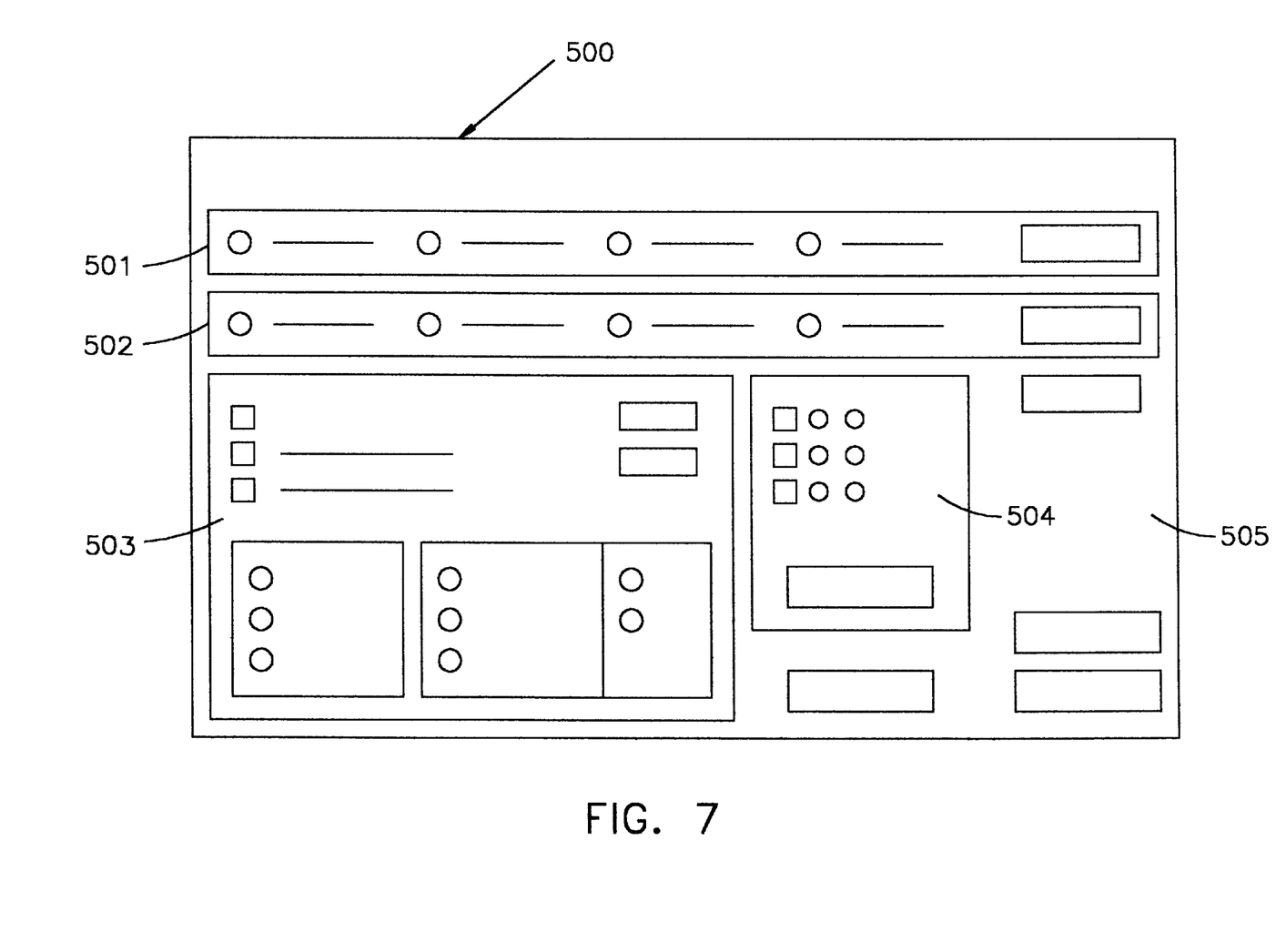
FIG. 7 is an illustration of the setting picture (guidance) of the image processing apparatus.

When the game has been processed by the main processor 21, the game picture is displayed on the display 3. When the settings are modified by the main processor 21, the setting means 213 is activated, and the setting means 213 can be operated by the operating means. At this time, a setting picture 500 is displayed as shown in FIG. 7. The setting picture 500 is described below. The player modifies the set values while observing the setting picture 500.

When step 42 is over, the main processor 21 determines whether or not the game is over (step 43). When the game is over (step 43: YES), the game-over process is executed (step 44). As a result, a display such as "game over," for example, is displayed on the display 3.

When the game is not over (step 44: NO), on the other hand, the main processor 21 executes the display frame number counting process and warning display process (step 45). When this display frame number counting process and warning display process are executed, the determining means 211 and display control means 212 are activated. The determining means 211 determines whether or not the main processing unit 2 has provided the operating environment expected by the application program according to the number of display Frames in the frame counter 241.

Figure 8:
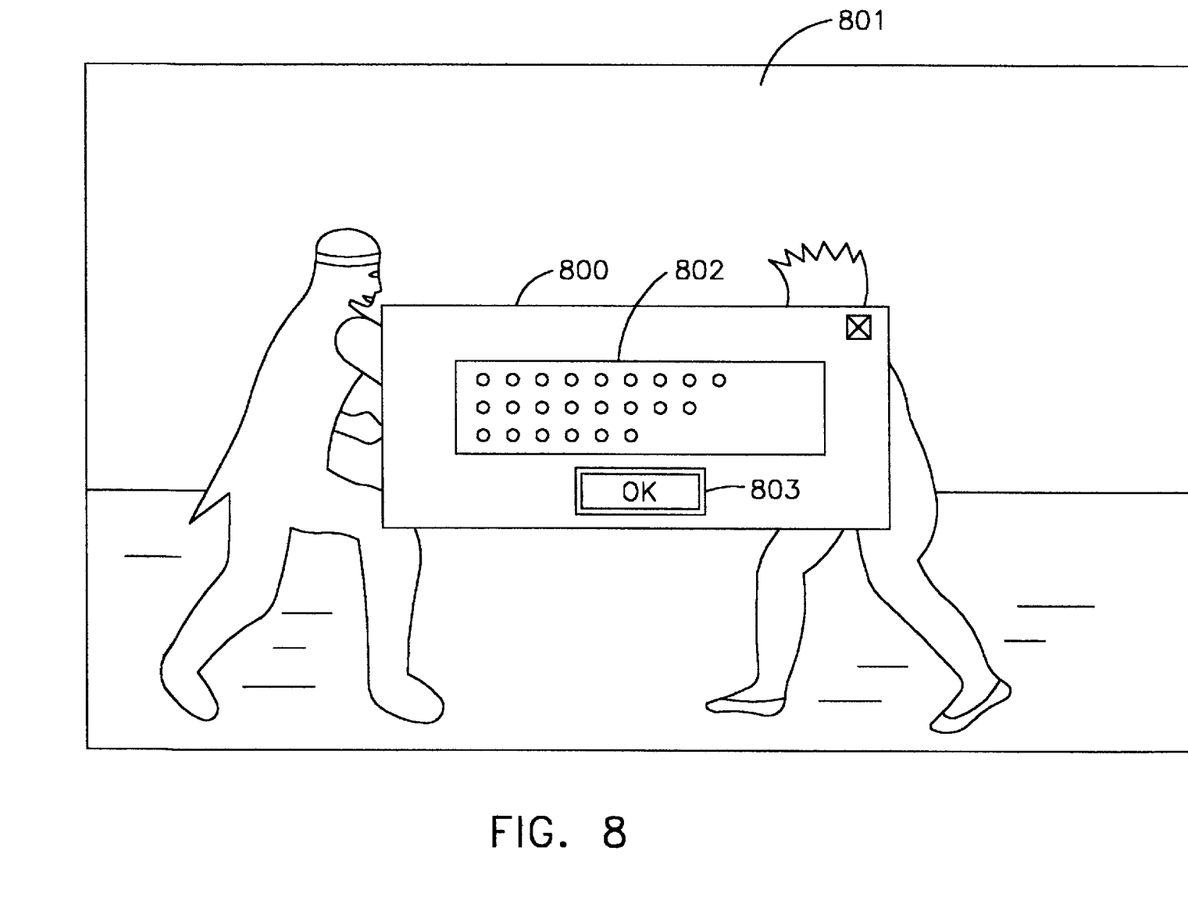
FIG. 8 is an illustration of the warning picture (guidance) of the image processing apparatus.

Here, when the determining means 211 has determined that a warning is necessary based on the number of display frames in the frame counter 241, the display control means 212 displays the warning picture 600 shown in FIG. 8 on the display 3 as guidance, depending on the extent of the number of frames.

At this time, the game picture is stopped. When the player views the warning picture 600 and clicks "OK" on the warning picture 600, the game can be processed again or the settings can be modified (step 42).

Figure 5:
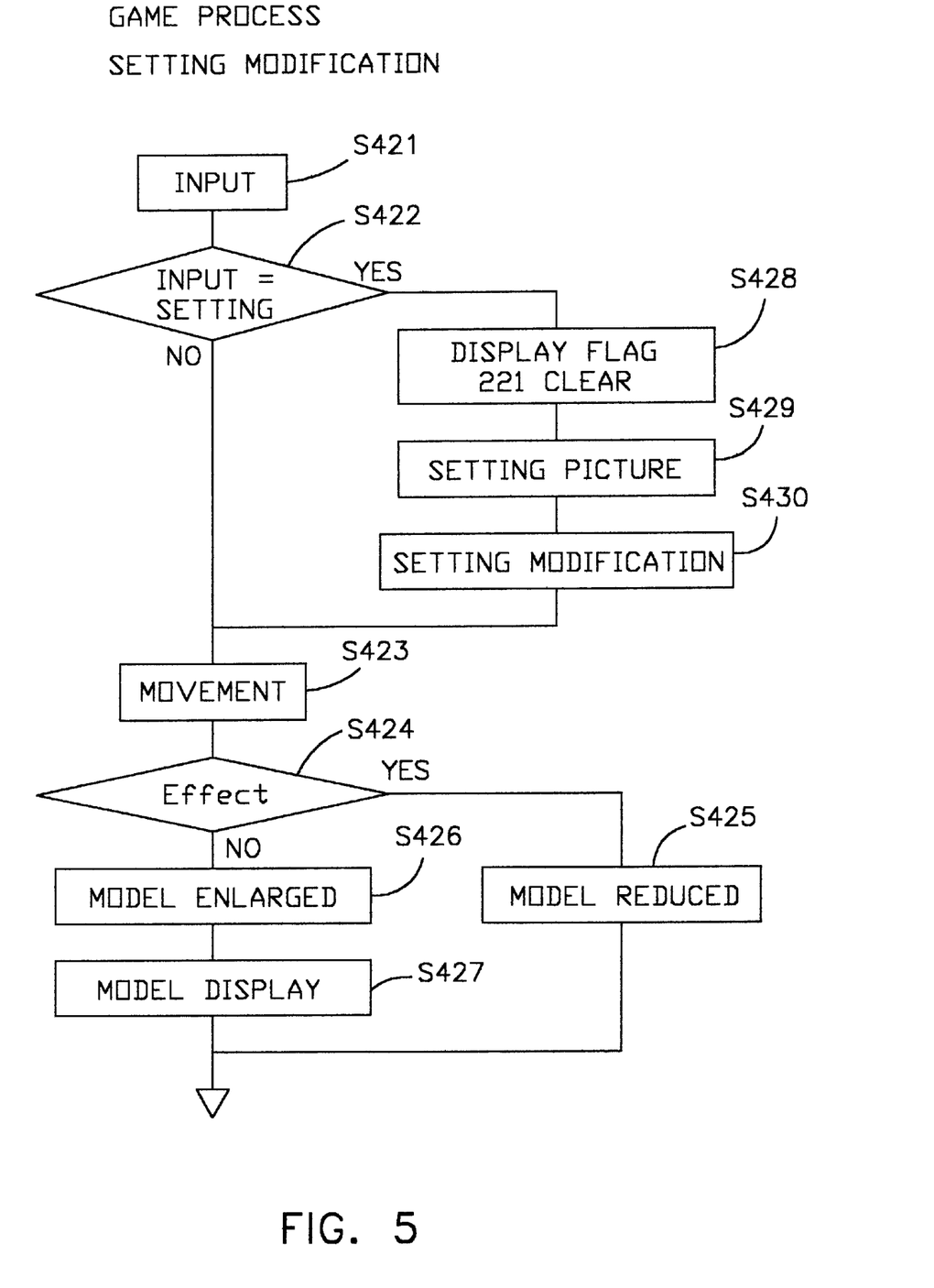
FIG. 5 is a flow chart depicting the game processing and setting modification processing by the image processing apparatus.

The operations after the main processing routine has entered into game processing or the like (step 42) are discussed next with reference to FIG. 5. At this processing stage, the main processor 21 takes in data input from an input unit such as the operating pads 6 and 6, keyboard 4, or mouse 5 (step 421). When the input data are not the set data (step 422: NO), the input data are determined to be signals to operate the game model and are given to the main processing unit 2.

The main processing unit 2 executes the game model movements based on the input data (step 423). Examples of processes that are executed include whether or not obstructions appearing in the course of the game have been avoided, whether or not contact has been made with the opponent character and as a result how to move the character operated by the player, and how to move a combatant in combat games.

The main processing unit 2 refers to the operating environment set in the set value memory zone 222, and when there is an effect (that is, a determination on whether or not the settings are effective) (step 424: YES), the program is set to low modeling (low polygon number) (step 425). When the main processing unit 2 refers to the set value memory zone 222 and there is an effect (step 424: NO), the program is set to high modeling (high polygon number) (step 426).

The main processor 21 subsequently processes the model display (step 427). As the game thus advances, images corresponding to the operating data are displayed on the display 3.

Input data are taken in from the input device (step 421), and when the main processing unit 2 determines that the input data are set (step 422: YES), the settings are modified (steps 428 through 430).

The setting means 213 is thus operated to clear the display flag 221 (step 428). The setting means 213 then displays the setting picture 500 indicated in FIG. 7 (step 429).

The setting picture 500 allows the settings to be set by focusing on points allowing the game qualities to be preserved. It becomes possible to set various elements that reduce the load of the image processing, such as reductions in character or prescribed background polygon numbers, picture reduction, reductions in the number of colors, non-application of texture, removal of specific background unrelated to game qualities, non-display of perspective, non-display of shadows, non-use of sound, and the like.

As shown in FIG. 7, the setting picture 500 has a setting area 501 for the input unit used by a first player, a setting area 502 for the input unit used by a second player, a setting area 503 for graphic processing, a setting area 504 for sound, and other setting areas 505 and the like.

The setting area 501 is constructed as an input picture for selecting various operating pads and keyboards used by a first player, and has an input button display. The setting area 502 is constructed as an input picture for selecting various operating pads and keyboards used by a second player, and has an input button display. The setting area 503 enables settings for non-texture shadow, non-texture stage, and character texture high resolution, and is constructed as an input picture with displays of minimum and maximum buttons for setting levels.

This setting area 503 is also constructed as an input picture for background settings, shooting settings, and level settings. The setting area 504 is constructed as an input picture relating to sound, with a sound volume setting button displayed. The setting area 505 is constructed as a picture for other settings, with an input button displayed.

While viewing the setting picture 500 described above, the player uses the mouse 5 or operating pads 6 and 6 to press down on the input pictures or buttons in setting areas 501 through 505 where settings need to be redone. The operating data from the input unit is given to the setting means 213 via the operating control means 214.

As a result, the new operating environment data are stored in the set value memory zone 222 by the setting means 213, allowing the operating environment to be reset (step 430). The operations following step 423 are then repeated.

The display frame counting process and warning display process are described below with reference to the flow chart in FIG. 6. The frame counter 241 in the display interface 24 counts the number of display frames. The frame counter 241 is a device in which the number of pictures displayed on the display 3 is counted every second.

The determining means 211 reads the number of display frames in the frame counter 241 (step 701). The determining means 211 then determines whether or not the number of display frames is at least 30 frames per second (step 702). When it is determined that the number of display frames is less than 30 per second (step 702: NO), the determining means 211 refers to the display flag 221 (step 703).

In this case, because the display flag 221 is cleared in the main process (step 41), the display flag 221 is "0" (step 703: YES), and it is determined whether or not the number of display frames is at least 27 per second (step 704).

When the determining means 211 has determined that the number of display frames is less than 27 per second (step 703: NO), the game is stopped, and the strong warning picture (guidance) 800 shown in FIG. 8 is displayed by the display control means 212 on the display 3.

When there are at least 27 frames per second in step 704 (YES), the game is stopped, and an ordinary warning picture (guidance) is displayed by the display control means 212 on the display 3.

The strong warning picture 800 or ordinary warning picture is displayed on the stopped game picture 801. The strong warning picture 800 consists of a suggestion 802 stating, for example, that "The current game is running at 22 frames per second. This game is intended to run at 30 frames per second. It is recommended that the proper settings be set," and an "OK" button 803.

The ordinary warning picture consists of the number of operating environment frames expected by the game program (for example, 30 frames per second), the current number of frames per second, and an "OK" button.

The warning picture 800 remains displayed on the game picture 801 as long as the player fails to click the "OK" button 803 (step 707: NO).

Here, when the player selects the "OK" button 803 using, for example, the mouse 5 or operating pad 6 (step 707: YES), the display flag 221 is turned on (step 708), leading to the game processing or setting modification in step 42.

The display flag 221 is used to avoid displaying the warning picture again after the "OK" button has been clicked to verify the contents of the warning picture already displayed.

As the game advances through higher stages, the image processing generally increases. As a result, 30 frames per second often cannot be displayed on the display 3. In this case, steps 428 through 430 in FIG. 5 are processed, allowing the operating environment of the game program to be sequentially reset so as to preserve the game qualities.

At this time, the operating environment of the game program is set in a state in which various image processes are omitted as the stages advance. The game thus proceeds at the expense of various image processes, even when the game program drops back down through lower stages.

Figure 6:
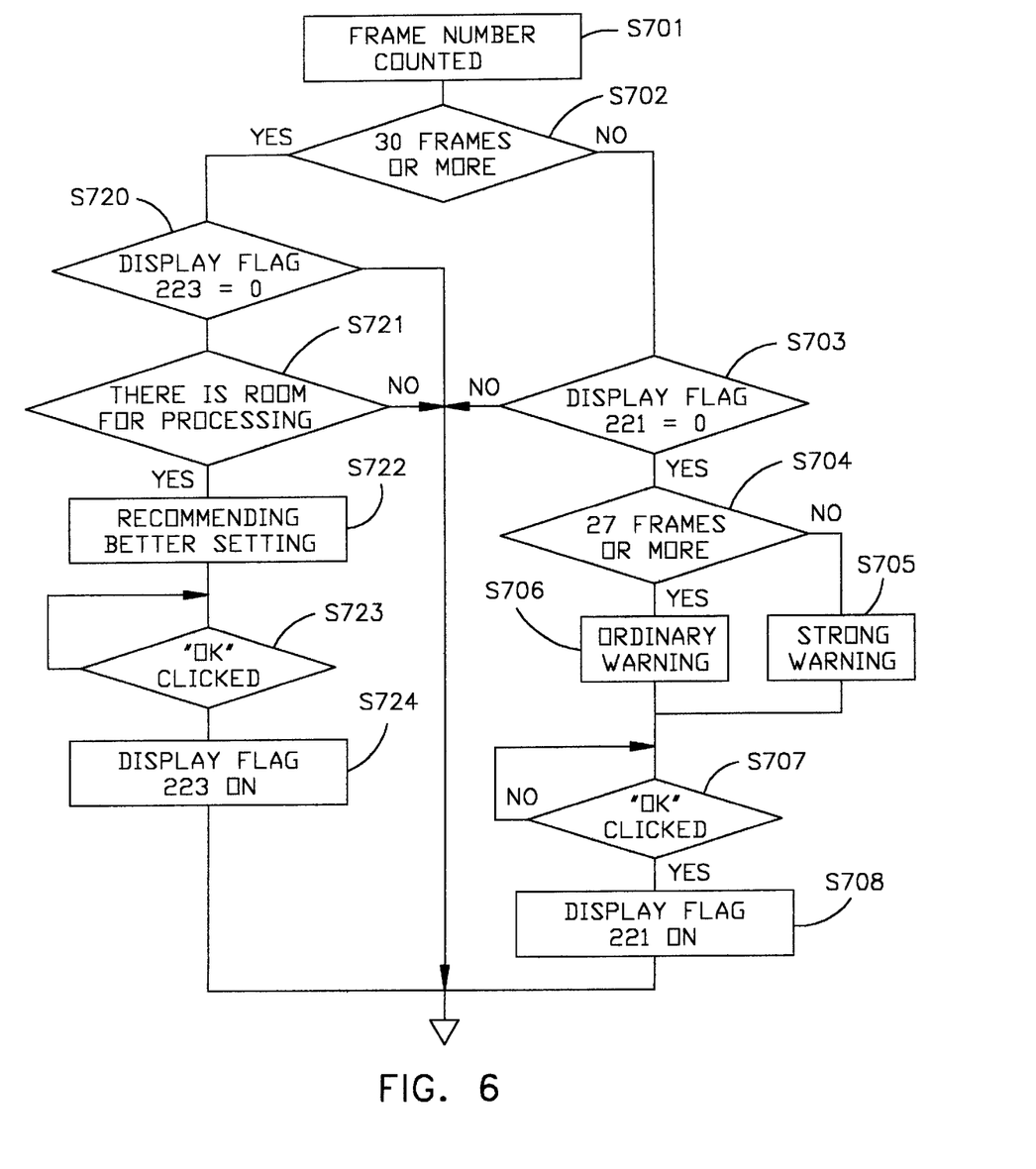
FIG. 6 is a flow chart depicting the determination of frame number and the guidance display processing by the image processing apparatus.

Steps 720 and 721 are thus provided in the flow chart in FIG. 6. This process is described below. The determining means 211 reads the number of display frames in the frame counter 241 (step 701). The determining means 211 then determines whether or not the number of display frames is at least 30 frames per second (step 702). When the results of the determination reveal at least 30 display frames per second (step 702: YES), the second display flag 223 is turned off (step 720: YES), and the determining means 211 determines whether or not there is room for processing (step 721).

Figure 9:
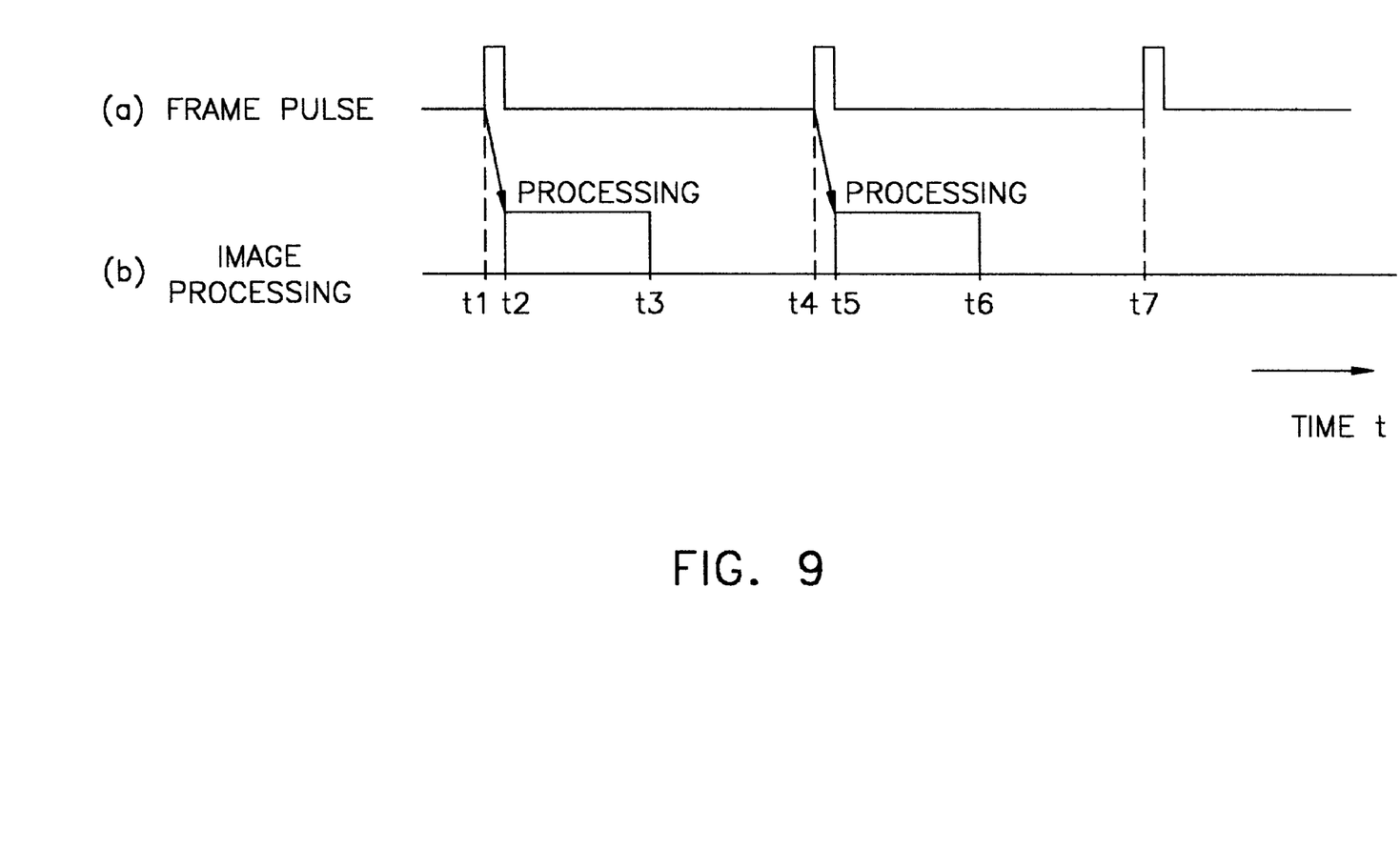
FIG. 9 is a timing chart illustrating the room-determining operations of the image processing apparatus.

This determination (step 720) proceeds as follows, for example. That is, the main processor 21 executes image processing synchronously with the frame synchronization pulse (time t1, t4, ... ) in FIG. 9(*a*). This image process, as shown in FIG. 9(*b*), is executed during a fixed processing period T, such as time t2 to t3, time t5 to t6, etc. The process period T is determined by the capability of the main processing unit 2.

Whether or not there is room for processing can be determined by measuring the time between the time t3, t6, etc. at which processing is completed and the time up to the frame synchronization pulse which is generated at time t4, t7, etc. Room for processing is determined as described above, for example, by the determining means 211.

However, when the determining means 211 determines that the second display flag 223 is not off (step 720: NO) or when it determines that there is not sufficient room for image processing (step 721: NO), the relevant routine is taken out without any processing.

When, on the other hand, it is determined that there is room for processing (step 721: YES), the display control means 212 is activated, and the message "The operating environment is being reset to a better state" (guidance) is displayed on the display 3 (step 722). This message (guidance) is displayed on the game picture in the same manner as when the strong warning picture 800 is displayed, the game picture is stopped as long as the "OK" button is not clicked (step 725: NO), and the relevant message (guidance) continues to be displayed on the picture.

When the mouse 5 or operating pad 6 is used to press down on the "OK" button in this state (step 723: YES), the second display flag 223 is turned on (step 724), and this course is taken out, leading to the process in step 12. The second display flag 223 is used to prevent the message (guidance) from being displayed every time.

Thus, in this embodiment of the present invention, when the main processing unit 2 does not provide the operating environment of the game program, the current number of game program display frames is displayed, and the proper number of game frames is displayed, allowing data suitable for preserving the game qualities to be given. Another advantage is that settings can be established to the user's satisfaction to preserve the game qualities.

In order to preserve the game qualities, the operating environment can be reset manually in the above embodiment, but it may also be done automatically. In this case, the current number of frames should be referenced to sequentially omit part of the image processing.

In addition, in the embodiment described above, the operating state of the application program is determined by the number of frames in unit times in the main processing unit, but this is not the only option. There are no particular limitations, as long as an element reflecting the image processing state is used.

The number of frames is not limited to the example given above.

As described above, in the present invention, it is determined whether or not the main processing unit has provided the operating environment expected by the application program, and guidance is displayed depending on the results of the determination, so the operating environment may be readily set by using the guidance. Furthermore, objective data for setting the operating environment is displayed in the guidance, thus ensuring that the operating environment car be set.

The present invention allows the operating environment for the application program to be set and the operating environment to be manipulated based on the guidance, so the operating environment can be set to the user's satisfaction, without the operating environment being set by the manufacturer.

Since it can be determined whether or not the main processing unit has provided the number of display frames expected by the application program, this determination can be managed reliably and promptly. Since, in addition, the guidance is a warning display in which the current number of display frames and the proper number of display frames are displayed, the difference between the operating environment of the main processing unit and that expected by the application program can be objectively grasped, and the environment can be set based on the difference.

Because the application program is a game program, it can be determined whether or not the main processing unit has provided the operating environment expected by the game program, and guidance can be displayed based on the results of the determination, allowing the game qualities to be readily preserved. Furthermore, objective data for setting the game program operating environment is displayed in the guidance, ensuring that the game program operating environment can be set.

It can also be determined whether or not the computing processing unit satisfies the operating environment needed to execute the application program from the medium carrying the data (including data recording media and communication channel), and a program allowing it to function as an image processing apparatus having the function of producing guidance and the like can be introduced to the computer system, constituting yet another convenience.

INDUSTRIAL APPLICABILITY

As described above, the image processing apparatus pertaining to the present invention displays guidance when the processing capability of computing systems is different from the operating environment expected by an application program, making it useful for determining the processing capability of computer systems that execute various applications, and making it particularly useful for computer systems that execute processes including graphics in games and the like.

What is claimed is:

1. An image processing apparatus equipped with means for allowing an application program to be adapted, and a main processing unit for forming graphic signals by executing the application program, said graphic signals from the main processing unit being displayed on a display means, wherein the main processing unit comprises:

determining means for determining whether or not the main processing unit has provided the operating environment expected by the application program; and output control means for outputting guidance basic on the results of determination by said determining means;

wherein said guidance contains a plurality of options for user's changing operation to change load for executing the application program.

2. An image processing apparatus as defined in claim 1, wherein the main processing unit further comprises:

setting means for allowing the operating environment of the application program to be set by the main processing unit; and operating means for allowing operations to be added to said setting means based on guidance.

3. An image processing apparatus as defined in claim 1, wherein said determining means comprises means for determining whether or not the number of display frames formed from said graphic signals from the main processing unit is the same as the number of display frames expected by the application program.

4. An image processing device as defined in claim 1, wherein the guidance is a warning display for displaying the current number of display frames per a certain period of time and the expected number of display frames per said period of time.

5. An image processing apparatus as defined in claim 1, wherein the application program is a game program.

6. A medium in which is recorded a program for activating a computer system as an image processing apparatus as defined in claim 1.

7. An image processing apparatus equipped with means for allowing an application program to be adapted to a general-purpose computer, and a main processing unit for forming graphic signals by executing the application program, said graphic signals from the main processing unit being displayed on a display means, wherein the main processing unit comprises:

determining means for determining whether or not the main processing unit has provided the operating environment expected by the application program; and output control means for outputting guidance based on the results of determination by said determining means;

wherein the guidance is a warning display for displaying the current number of display frames per a certain period of time and the expected number of display frames per said period of time.

* * * * *